United States Patent Office 3,450,581
Patented June 17, 1969

3,450,581

PROCESS OF COATING A SEMICONDUCTOR WITH A MASK AND DIFFUSING AN IMPURITY THEREIN

Samuel R. Shortes, Dallas, Tex., assignor to Texas Instruments Incorporated, Dallas, Tex., a corporation of Delaware Continuation of application Ser. No. 273,187, Apr. 15, 1963. This application July 29, 1966, Ser. No. 568,979
Int. Cl. C23c *15/00;* H01l *7/44*
U.S. Cl. 148—187 26 Claims

ABSTRACT OF THE DISCLOSURE

Disclosed are methods of processing semiconductor substrates and devices by depositing an impurity-containing silicon oxide layer on a semiconductor wafer and diffusing the impurity from the oxide into the wafer. Disclosed also are methods and apparatus for applying the impurity-containing silicon dioxide layer by means of sputtering techniques.

This is a continuation of application Ser. No. 273,187, filed Apr. 15, 1963 now abandoned, and Ser. No. 356,188, filed Mar. 31, 1964, now abandoned, both assigned to the same assignee. The invention herein appertains to subject matter of the class described in my copending application, "Diffusable Substrates and Diffusion Processes," Ser. No. 270,749, filed Apr. 4, 1963, now abandoned, which application is also assigned to the assignee of the instant application.

This invention relates to compound semiconductor diffusion substrates and processing such substrates to fabricate various compound semiconductor devices and networks, and more particularly to forming diffusion substrates of compound semiconductors which include a layer of an oxide of silicon containing one or more conductivity-affecting impurities deposited over various regions wherein diffusion is desired, and further containing coatings of oxide of silicon to prevent deterioration of the compound semiconductor yet permit diffusion of conductivity-affecting impurities solely from the impurity containing layer.

This invention also relates to fabrication of semiconductors utilizing oxide coating as well as conductivity-affecting or conductivity-determining impurity-bearing oxide coatings, and more particularly to fabrication of semiconductors and devices utilizing silicon oxide coatings of the class described, and a method of producing such coatings on semiconductor materials by reactive sputtering.

The term "sputtering" refers to the process whereby an electrical discharge is passed between electrodes at a low environmental gas pressure and the cathode is disintegrated under the bombardment of ionized gas molecules, the disintegrated particles of the cathode leaving its surface either as free atoms or in chemical combination with the environmental gas molecules. Some of the liberated atoms are returned to the cathode by collision with gas molecules. Others are deposited on surrounding surfaces adjacent the cathode. When a chemically inert gas, such as argon, is used as the environmental gas, the particles liberated from the cathode are deposited on the anode in pure elemental form. This process is known as "physical" sputtering. However, when the environmental gas is comprised of a mixture of inert gas and a reactive gas, such as oxygen, the atoms liberated from the cathode react with the oxygen and are deposited as oxides of the cathode material. This process is termed "reactive" sputtering.

Many of the compound semiconductors, and particularly the Group III–V compound semiconductors, are compounds in which at least one of the elements is relatively volatile, especially in the temperature range over which vapor-solid diffusion generally may be achieved. Surface pitting and oxidation have also been serious limitations on the diffusion of conductivity-affecting or conductivity-determining impurities into silicon and germanium.

Deterioration of compound semiconductors at high temperatures is among the difficulties of making devices therefrom. The difficulty is apparent in the Group III–V compound semiconductors, and more specifically gallium arsenide, indium arsenide, indium antimonide, etc. or other compounds having at least one relatively volatile constituent element and particularly volatile in a temperature range whereover vapor-solid diffusion may be achieved.

Previous workers in the art have attempted to avoid the volatility problem resulting in deterioration of compound semiconductors by utilizing sealed ampoules for vapor-solid diffusion wherein the impurity source is maintained at a temperature appropriate to control its vapor pressure and the substrate is maintained at another temperature appropriate for diffusion. Also, attempts have been made to achieve vapor-solid diffusion by maintaining an ampoule containing an impurity source and the substrate at a uniform diffusion temperature, such ampoule being sufficiently small that the amount of volatile constituent necessary to establish equilibrium vapor pressure at the diffusion temperature may be volatilized from the surface of the compound semiconductor without grossly altering the substrate surface. Such techniques have had only limited success due to the fact that surface deterioration still occurs and control over the diffusant and the surface concentrations thereof in the semiconductor still remains difficult.

Other attempts have been made to avoid surface pitting and oxidation during diffusion of germanium and silicon by causing the surface of the semiconductor to be uniformly oxidized prior to diffusion. The semiconductor surface may be oxidized by heating it in the presence of oxygen or water vapor. However, because part of the semiconductor is consumed during the oxidation, control of diffusion depth and concentration of the diffusing impurity is very difficult, particularly in wafers in which P-N junctions have been previously formed.

This invention utilizes one of the features of the invention disclosed in copending application Ser. No. 356,189, filed Mar. 31, 1964, entitled, "Sputtered Oxide Masks for Semiconductors and Methods and Apparatus for Making Same," filed in the names of Stephen S. Baird and Clyde R. Fuller and assigned to the assignee of the instant application, in that an oxide of silicon is formed which is independent of the semiconductive body, or substrate, being coated. The oxide is formed and deposited on the surface of the semiconductive body simultaneously. Hence, it will be appreciated that films of silicon oxide advantageously may be formed in intimate contact with any semiconductor surface without consuming or damaging the semiconductor substrate and without causing appreciable heating of it.

Briefly, the present invention pertains to a method of producing an adherent coating, deposit, or layer, of an oxide of silicon on the surface of any semiconductor substrate, by the reactive sputtering of silicon.

More specifically, the invention relates to protecting the compound semiconductor from deterioration while permitting diffusion of impurities in various selected portions of the compound semiconductor thus affording highly flexible diffusion substrates for forming laser devices, compound semiconductor integrated circuit devices, etc.

The present invention also provides a method of producing oxide films, or layers, on the surfaces of semiconductor wafers, or substrates, which protect the wafers from deterioration during diffusion, but through which conductivity-affecting or conductivity-determining impurities may diffuse into the wafer. The invention herein provides not only protection of the compound semiconductor surface to avoid surface deterioration, but permits selective distribution of impurities into the compound semiconductor surface. For example, an oxide of silicon containing an impurity is evaporated or reactively sputtered or otherwise deposited onto a portion of the surface whereunder a diffused region is desired. The portion of the wafer not coated with the impurity-containing oxide of silicon, as well as the diffusant coat, is further overcoated with an oxide of silicon sufficiently thick to prevent deterioration of the compound semiconductor surface, as well as prevent diffusion therethrough.

Furthermore, it should be appreciated that the oxide of silicon provides greater controllability of the surface concentration of impurities and also the diffusion profile. Likewise, as in my copending application, another advantage of the oxide of silicon deposit is that it affords vapor-solid diffusion into a compound semiconductor in sealed system or in an open tube diffusion system.

Moreover, the invention herein appertains to producing various compound semiconductor diffusion substrates having at least partially thereover an intimate layer of an oxide of silicon containing conductivity-affecting impurities therein. The compound semiconductor, at least in areas not having the layer, is protected with an oxide of silicon to prevent deterioration of the compound semiconductor. Also, the oxide of silicon containing the conductivity-affecting impurities may be overcoated with an oxide of silicon sufficiently thick to prevent the escape of impurities by diffusion from the oxide of silicon layer other than into the substrate. Thus, it will be appreciated that the various compound semiconductor integrated circuit devices containing resistive and capacitive regions, ohmic interconnections, transistors, diodes and the like, may be fabricated readily by depositing the oxides of silicon containing the appropriate impurities therein over the regions wherein the various devices will be fabricated. Likewise, various diodes, transistors, etc. can be fabricated by the technique of this invention.

One of the main features of the invention is the improved planarity or flatness achieved in forming P-N junctions by diffusing conductivity-affecting impurities from the oxide of silicon layer into the compound semiconductor, the oxide of silicon layer containing uniformly distributed therein the conductivity-affecting impurities. The planarity improvement is believed to be better than the improvement disclosed in my copending application hereinbefore referenced. It is believed apparent that the enhanced planarity or flatness of the P-N junction will provide enhanced laser devices heretofore unobtainable.

According to this feature of the invention, a method is also provided for producing oxide films which not only protect the wafers from deterioration, but also contain conductivity-affecting or type-determining impurities in predetermined amounts which diffuse from the oxide film into the semiconductive wafer when the coated wafer is subjected to normal or conventional diffusion temperatures.

It will be appreciated that since the surface of the semiconductive body undergoes no chemical change during the coating process, sputtered films may also be placed on the surfaces of a semiconductive body in which P-N junctions have previously been formed, without altering the physical or electrical characteristics of the semiconductive body. Hence, double-diffused planar transistor structures, other transistor structures, diodes, capacitors, and various integrated circuit devices containing resistive and capacitive regions, ohmic interconnections, transistors, diodes, and the like, may be readily fabricated by depositing reactively sputtered oxides of silicon which contain appropriate impurities therein over the regions in which the various devices and components are to be selectively fabricated.

Moreover, sputtered silicon oxide films have sufficient dielectric properties for use as the dielectric component of capacitors. Thus it will be appreciated that in the fabrication of integrated circuits, silicon oxide, a dielectric, may be reactively sputtered onto regions coated with metallic films and thereafter overcoated with another metallic film to form capacitive devices.

It is therefore an object of the invention to provide a method of producing a protective coating of an oxide of silicon on the surface of semiconductor materials for preventing decomposition or deterioration of the material surface when said material is subjected to conventional diffusion temperatures.

Another object of the invention is to provide a method of producing films of silicon oxides on the surface of semiconductor material so as to effectively prevent deterioration and decomposition of the semiconductor, and yet permit diffusion of conductivity-affecting or type-determining impurities therethrough.

Still another object of the invention is to provide a method of producing films of silicon oxides which contain conductivity-affecting or conductivity-determining impurities therein, said films being sufficiently thick to prevent deterioration and decomposition of the semiconductor material surface on which the film is deposited.

Yet another object of the invention is to provide a method of producing selectively diffused regions in semiconductive materials.

Another object of the invention is to provide a method of producing localized planar diffusions in semiconductive materials.

Still another object of the invention is to provide a protective film which does not consume or damage the semiconductive substrate.

A still further object of the invention is to provide a film of silicon oxide which contains conductivity-affecting or type-determining impurities which may diffuse from the silicon oxide film to form localized diffused regions in the underlying regions of the semiconductive material, and a method of producing said film.

Another object of the invention is to provide planar double-diffused regions in semiconductor materials.

A further object of the invention is to provide double-diffused planar junction devices.

Another object of the invention is to provide a method of open tube diffusion of a compound semiconductor without surface deterioration of said compound semiconductor, yet provide close control over the regions and amount of diffusion occurring.

Another object of the invention is to provide a method of diffusing conductivity-affecting impurities into a Group III–V compound semiconductor by providing a layer of silicon dioxide containing the conductivity-affecting impurities over the surface of the semiconductor of a thickness or depth sufficient to protect said semiconductor surface from deterioration yet allow diffusion of the impurities thereinto.

It is a further object of the invention to provide a method of making a compound semiconductor device having selectively controlled diffused regions therein along with controlled surface concentrations without deterioration of the surface during the diffusion processes.

It is another further object of the invention to provide a compound semiconductor diffusion substrate which includes the compound semiconductor and an intimate layer thereover of an oxide of silicon containing conductivity-affecting impurities in selected regions thereof sufficiently thick to prevent deterioration of the underlying compound semiconductor substrate yet allow diffusion thereinto solely from the impurities in said intimate layer.

Still another object of the invention is to provide a Group III–V compound semiconductor diffusion substrate which includes the compound semiconductor and an intimate layer thereover of an oxide of silicon, part of said layer containing conductivity-affecting impurities, said layer being sufficiently thick to prevent deterioration of the underlying compound semiconductor substrate yet allow diffusion thereinto solely of the impurity contained within said intimate layer to the exclusion of impurities unavoidably maintained in the diffusion environment.

It is another object of the invention to provide various compound semiconductor devices such as lasers, diodes, transistors, etc., according to the processes appertaining to the invention.

These and other objects and advantages of the invention will become more readily understood when taken with the following detailed description, appended claims and attached drawings in which:

FIGURE 1 schematically depicts an elevational view partially in section of exemplary apparatus suitable for producing reactively sputtered oxides of silicon according to this invention;

FIGURES 2*a* and 2*b* are sectional views of a compound semiconductor wafer which has been partially coated with a protective film in accordance with the invention prior to its exposure to a diffusion environment;

FIGURES 3*a–d* are fragmentary perspective views partly in section of a semiconductor wafer in which a planar P-N junction is formed by diffusion from an impurity-containing silicon oxide film produced in accordance with the invention;

FIGURES 4*a–d* are fragmentary perspective views partly in section of semiconductor wafer in which a planar P-N junction is formed by diffusing conductivity-determining impurities through a thin region in a differential depth layer of an oxide of silicon formed in accordance with the invention;

FIGURE 5 is a fragmentary view partly in section of a capacitive device utilizing a sputtered silicon oxide film;

FIGURES 6*a–d* are fragmentary perspective views partly in section of a semiconductor wafer having a planar P-N junction formed therein by diffusion of impurities from an impurity-containing oxide film formed in accordance with the invention;

FIGURES 7*a–i* are fragmentary perspective views partly in section of a semiconductor wafer showing various stages of fabrication of a planar double-diffused transistor fabricated in accordance with the invention;

Similar reference characters indicate corresponding parts throughout the several views of the drawings.

Figure 1:
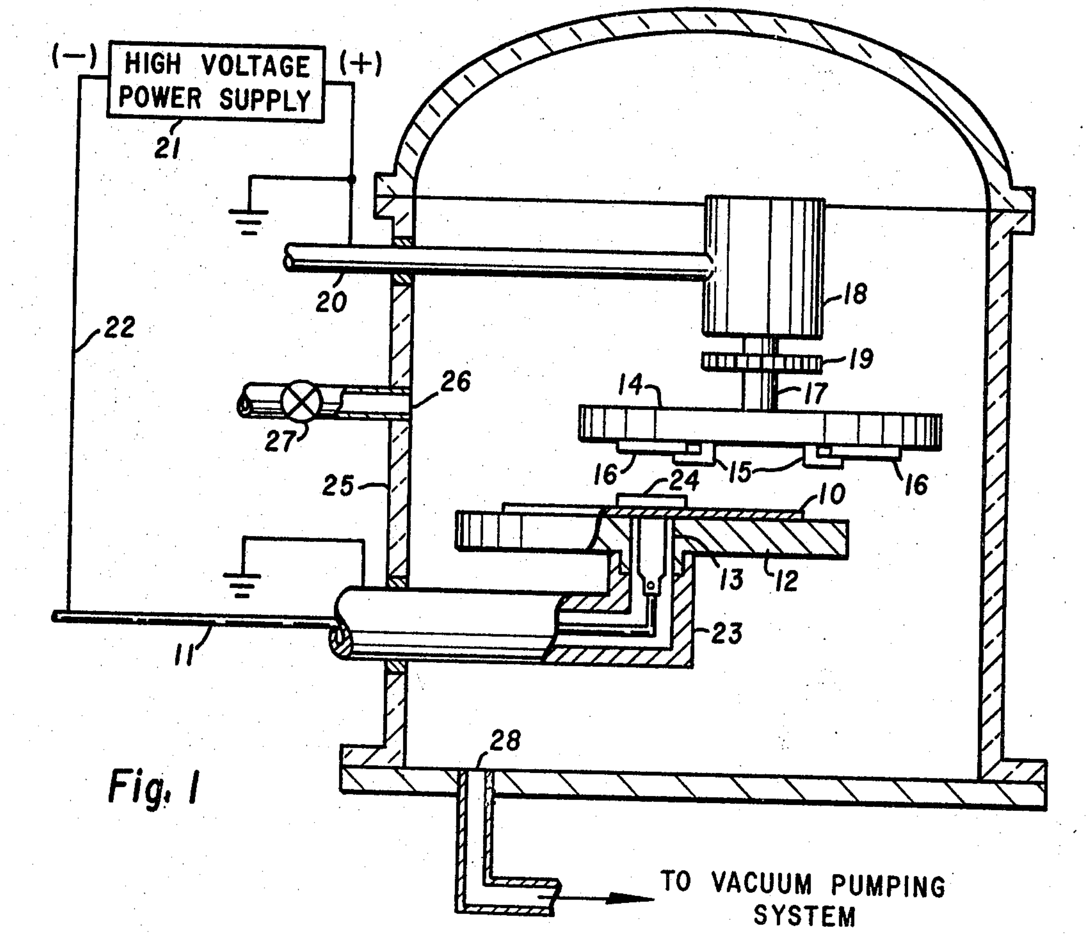

Dimensions of certain of the parts as shown in the drawings have been modified and/or exaggerated for the purpose of clarity of illustration.

In FIGURE 1 is illustrated an exemplary embodiment of apparatus for depositing oxides of silicon onto a semiconductor substrate or wafer. The apparatus comprises a silicon disc 10 in electrical contact with high voltage lead 11. The silicon disc 10 serves as the cathode and is positioned and supported on an insulating base 12 such that the high voltage lead 11 electrically engages the silicon disc by protruding through an opening 13 provided in the base. The insulating base 12 is mounted by any suitable means (not shown) and maintained in a fixed position. Immediately above the silicon disc 10 is a work holder 14 which provides on its undersurface a series of retaining clips 15, each of which detachably mounts and retains a semiconductor substrate or wafer 16 to be coated. The work holder 14 is a circular plate secured to the underside of a rotatable shaft 17 journaled in a suitable bearing and support housing shown at 18. Shaft 17 fixedly mounts a gear sprocket 19 that engages a chain drive (not shown) for rotating shaft 17. The center line of shaft 17 is spaced from the cathode 10 (and 24) so that upon rotation of shaft 17 and work holder 14 at least one of the wafers 16 supported adjacent the periphery of said work holder will be centered and positioned directly over and in alignment with the cathode 10 (and 24). A support arm 20 connects the bearing housing support 18 to a suitable bracket or support (not shown) by means of which the semiconductor wafers 16 (serving as anodes) are adjustably positioned and maintained at a variably fixed distance above the silicon disc 10 and centered thereover. The positive terminal of a high voltage supply 21 is electrically connected to the support arm 20 which is grounded. The negative side of the voltage supply 21 is electrically connected to the lead 11 by line 22 and shielded by a grounded metallic sheath 23. When the apparatus is in operation, the silicon disc 10 carries a negative charge and thus becomes the cathode. The undersurface of work holder 14 together with wafers 16 and clips 15, although at ground potential, are positive with respect to the cathode and thus becomes the anode. Since the sputtering operation of this invention is performed in an oxygen-containing atmosphere, the apparatus is suitably housed within a chamber 25 to provide the desired controlled envivronment.

The chamber 25 is evacuated through an orifice 28 with a suitable vacuum pumping system, and an oxygen-containing gas mixture is admitted at inlet 26 by means of a needle valve schematically shown at 27 to provide an environment of oxygen-containing gas at a relatively low pressure within the chamber. By relatively low pressure is meant a pressure on the order of less than one atmosphere, a suitable example being about 0.040 torr.

When an electrical discharge is passed between the electrodes 10 and 15, the silicon cathode 10 is slowly and, at least partially, disintegrated under the bombardment of ionized gas molecules. The liberated particles of silicon leave the cathode surface either as free silicon atoms or in chemical combination with oxygen. Some of the liberated silicon atoms are returned to the cathode by collison with the gas molecules, but others are deposited on surfaces surrounding the cathode, particularly on the undersurface of work holder 14. It will be appreciated that the oxide of silicon is formed by a reactive sputtering process wherein the free silicon from the cathode 10 chemically combines with oxygen in a reactive gas atmosphere to produce oxides of silicon, as contradistinguished from purely physical sputtering wherein atoms are liberated from the cathode by bombardment with ionized gas molecules of a chemically inert gas, such as argon, and deposited in the same elemental form without reacting with the gas molecules.

The work holder 14 is so rotated that several substrate units 16 individually pass over the center of the cathode disc 10, to result in the deposition of a film of uniform thickness over the surface of each of units 16. Silicon oxide is not deposited on the small portion of the substrate unit 16 directly above and in contact with the retaining clip 15, therefore this portion of the unit is generally removed after deposition.

Control of three main variable parameters; namely, gas pressure, electrode separation, and applied voltage is important for effective reactive sputtering. These parameters control interrelated parameters such as current density, temperature, and deposition rate.

Gas pressure is directly related to deposition rate since the cathode material is removed by the force of impinging gas atoms or ions. Theoretically, sputtering could occur if only a single gas atom is available for ionization. As a practical limit, however, reactive sputtering is very slow and generally has been found to be commercially impractical at gas pressures of less than about $10^{-3}$ torr. Furthermore, sufficient oxygen must be available to allow the liberated silicon to react and form an oxide. Increased availability of gas atoms initially increases the sputtering rate. However, as the gas pressure increases, the sputtered material undergoes an increased number of collisons with the environmental gas atoms and less of the total amount of sputtered material reaches the anode. As a practical limit, the process has generally been found commercially inefficient at pressures greater than about 0.5 torr. The preferred gas pressure range is from about 0.01 torr to about 0.07 torr.

The preferred electrode separation is about 1 to about 8 cm. Arcing may occur if the electrode separation is less than about 1 cm. Deposition rate is decreased with increased separation.

It is necessary for the applied voltage to equal or exceed that necessary to impart sufficient energy to the ionized atoms or molecules to free silicon atoms from the cathode on impact therewith. Stated otherwise, the applied voltage must be sufficient to cause ionized atoms or molecules of the environmental gas to strike the surface of the silicon cathode 10 with sufficient energy to free the silicon atoms from the silicon lattice. It will be understood that higher energy gas atoms will produce more energetic silicon atoms and thereby increase the deposition rate. For effective reactive sputtering the applied voltage should not be high enough to produce arcing. The preferred voltage range is from about 300 to about 4500 volts.

The deposition rate is also directly proportional to the current density, which is limited by the allowable temperature increase in the system. The deposition rate may be substantially increased by increasing the current density if cooling techniques are employed.

It will be appreciated that all the operating variables are interrelated; hence many various controlled conditions will produce satisfactory depositions. However, when the three main variable parameters are maintained within the ranges given above, oxides of silicon will be formed and deposited at predictable rates. Optimization of one parameter may have detrimental effects on another; for example, increasing the applied voltage increases the incident energy of the ions impinging on the cathode. To increase the voltage and maintain the same power dissipation, it is necessary to decrease the gas pressure in order to decrease the current. Pressure reduction generally requires greater separation of the electrodes. Thus the advantage of higher energy ion bombardment may be offset by greater separation of cathode and anode.

Representative values of deposition rate at various sputtering conditions under which silicon oxide coatings have been produced on semiconductive substrates according to the invention are shown in Table I and illustrate the invention. In Table I values are also given for the measured current and cathode diameter from which the various current densities can be readily calculated.

TABLE I

| Substrate Material | Applied Voltage in Volts | Measured Current in Milli-amperes | Cathode Diameter in Centimeters | Electrode Separation in Centimeters | Environmental Gas in Chamber | Gas Pressure in Torr | Deposition Rate in Angstrom Units/Hour |
|---|---|---|---|---|---|---|---|
| GaAs | 1,800 | 60 | 7.9 | 3.2 | Oxygen | .040 | 1,450 |
| Si | 1,800 | 60 | 7.9 | 3.2 | do | .040 | 1,450 |
| Ge | 1,800 | 60 | 7.9 | 3.2 | do | .040 | 1,450 |
| Si | 3,000 | 60 | 7.9 | 4.45 | $O_2$-Ar | .020 | 1,600 |
| Al | 3,000 | 60 | 7.9 | 4.45 | $O_2$-Ar | .020 | 1,600 |
| Si | 1,625 | 30 | 7.9 | 3.0 | Oxygen | .020 | 600 |
| Si | 1,825 | 40 | 7.9 | 3.0 | do | .020 | 850 |
| Si | 1,100 | 30 | 7.9 | 3.0 | do | .040 | 600 |
| Si | 1,250 | 40 | 7.9 | 3.0 | do | .040 | 750 |
| Si | 1,375 | 50 | 7.9 | 3.0 | do | .040 | 1,100 |
| Si | 925 | 30 | 7.9 | 3.0 | do | .060 | 500 |
| Si | 1,050 | 40 | 7.9 | 3.0 | do | .060 | 600 |
| Si | 1,150 | 50 | 7.9 | 3.0 | do | .060 | 800 |
| Si | 1,450 | 30 | 7.9 | 5.0 | do | .025 | 475 |
| Si | 1,575 | 40 | 7.9 | 5.0 | do | .025 | 510 |
| Si | 1,750 | 50 | 7.9 | 5.0 | do | .025 | 550 |
| Si | 2,000 | 95 | 7.9 | 3.0 | do | .035 | 1,100 |
| Si | 1,500 | 100 | 7.9 | 3.0 | do | .065 | 730 |
| Si | 2,000 | 125 | 7.9 | 3.0 | do | .050 | 1,450 |
| Si | 1,000 | 55 | 7.9 | 3.0 | do | .100 | 100 |
| GaAs | 1,800 | 120 | 9.5 | 2.54 | do | .046 | 1,050 |
| GaAs | 1,800 | 120 | 9.5 | 2.54 | $O_2$-Ar | .046 | 1,050 |
| Ge | 1,800 | 120 | 9.5 | 2.54 | Oxygen | .046 | 1,500 |
| GaAs | 1,800 | 60 | 7.0 | 2.54 | do | .040 | 1,300 |
| Ge | 1,800 | 60 | 7.0 | 2.54 | do | .040 | 1,300 |
| Si | 1,800 | 60 | 7.0 | 2.54 | do | .040 | 1,300 |
| InAs | 1,800 | 60 | 7.9 | 3.2 | do | .040 | 1,450 |
| InSb | 1,800 | 60 | 7.9 | 3.2 | do | .040 | 1,450 |

Conductivity-affecting impurities may be included in the sputtered film by placing an impurity source 24 (FIGURE 1) directly on and in the center of the surface of the cathode 10. Such an impurity source may be a piece of pure metal, such as zinc, or an alloy, or a compound containing the desired conductivity-affecting or type-determining impurity, such as $Ga_2Se_3$. Since the impurity source 24 is in contact with the silicon cathode 10, it may properly be termed an impurity cathode. The impurity is reactively sputtered onto the anode in a manner similar to the manner in which silicon is reactively sputtered. However, since the impurity is sputtered simultaneously with the silicon, it is included in the oxide film as an oxide or silicate of the impurity. Since sputtering is effected by impinging high energy ions upon the cathode, the relative areas of the exposed surfaces of the silicon cathode 10 and the impurity cathode 24 determine the ratio of impurity atoms to silicon atoms in the deposited film. Thus, if the ratio of impurity cathode surface area to silicon cathode surface area is small, the ratio of impurity atoms to silicon atoms in the resultant film will also be small.

It will also be appreciated that other techniques may be employed to produce films containing conductivity-affecting or type-determining impurities, such as using an alloy, a compound, or a mixture of silicon and the desired impurity as a cathode; or by introducing the desired impurity in gaseous form directly into the system or in combination with the oxygen-containing gas.

Thus it will be understood that any of the conventional impurities, such as aluminum, gallium, phosphorus, boron, or antimony, may be included in the silicon oxide to dope Group IV semiconductors either N- or P- type. Likewise, sulfur, selenium, zinc, cadmium, copper, manganese, or magnesium, or any other suitable impurity, may be included in silicon oxide films to produce selectively diffused regions in compound semiconductor materials.

Typical operating conditions for reactively sputtering approximately 1,000 angstroms per hour of silicon oxide onto the compound semiconductor wafers is achieved under the conditions following. A gas pressure of 40 microns of oxygen is maintained as the environment for sputtering. The silicon cathode is less than 0.01 ohm-cm. (arsenic doped) crystalline disc about 4 inches in diameter. The distance between the top surfaces of silicon cathode and the bottom surface of the semiconductor slice holder is about 1.25 inches. A negative voltage of about 1500 volts DC is applied to the silicon cathode and develops a current of about 40 milliamps. The slice holder is rotated at approximately 50 r.p.m. The compound semiconductor slices under the applied voltage reach a temperature of about 200° C. in approximately 20 minutes and remain relatively constant thereafter. During the first 30 minutes of sputtering, the slice may be shielded to prevent deposition of the oxide thus permitting cleaning of the cathode prior to actual sputtering of the silicon oxide film onto the compound semiconductor wafer. The silicon oxide produced by this method is believed to be substantially silicon dioxide ($SiO_2$), whereas oxides produced by other methods generally contain SiO as well as $SiO_2$. Accordingly, the term "silicon dioxide" is used herein to describe oxides produced by reactive sputtering and not necessarily chemically pure $SiO_2$.

Representative or typical conditions under which impurity-containing silicon oxide films have been deposited on semiconductive substrates in accordance with the invention are shown in Table II. The oxide films so produced contain sufficient amounts of conductivity-affecting or type-determining impurity to produce impurity-diffused regions in the underlying semiconductor substrates when said substrates were exposed to conventional diffusion temperatures. The amount of impurity contained in the films was controlled by appropriate selection of the ratios of the surface areas of the impurity and silicon cathodes.

Figure 3B:
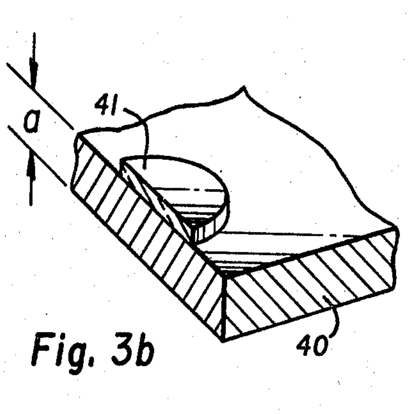
Figure 3A:
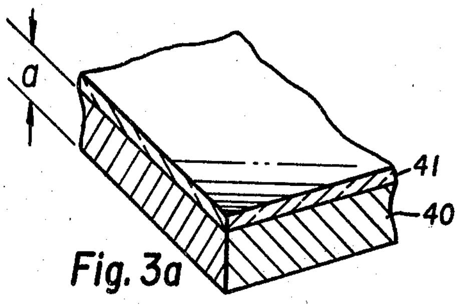
Figure 3D:
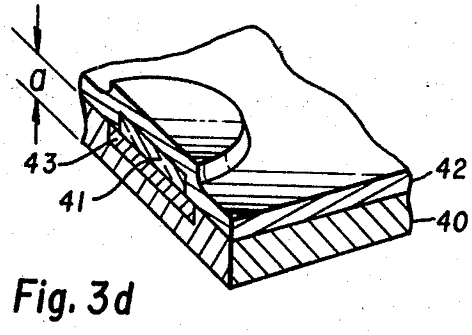
Figure 3C:
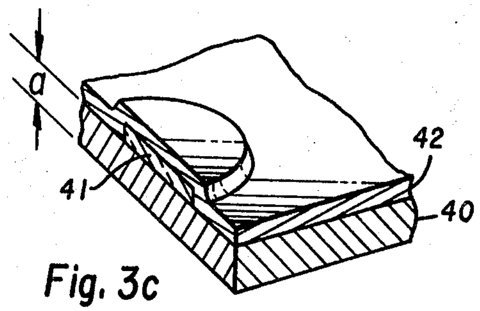

FIGURES 3*a–d* depict a planar P-N junction formed in a semiconductive wafer using reactively sputtered films produced in accordance with the invention. FIGURE 3*a* represents a semiconductive wafer 40 on which has been deposited an impurity-containing silicon oxide layer 41. FIGURE 3*b* shows the same wafer 40 after all of the layer has been removed except a small circular portion shown at 41. Thereafter, as shown in FIGURE 3*c*, another silicon oxide layer 42 containing no conductivity-affecting or type-determining impurities is deposited over both the exposed surface of the wafer 40 and the impurity-containing layer 41, resulting in the structure as shown in FIGURE 3*c*. FIGURE 3*d* shows the diffused region 43 which is formed in the wafer 40 by the diffusion of impurities from layer 41 into the wafer 40 when the wafer is exposed to conventional diffusion temperatures. It will be appreciated that when the impurity-bearing layer 41 contains conductivity-affecting impurities of opposite type of that of the semiconductive wafer 40, the diffused region 43 will be of opposite-type conductivity from that of the remainder of the wafer 40. Thus a planar P-N junction is formed such that wherever the P-N junction intersects the surface of the semiconductive wafer, it is covered by a passivating oxide layer 42. Moreover, since impurity diffusion is restricted to the regions adjacent portions of the impurity-containing layer 41, this process is particularly advantageous for the formation of planar diffused regions in silicon or germanium when the diffusing impurity is gallium. Although silicon oxide is generally ineffective as a mask against the diffusion of gallium, reactively sputtered oxides of silicon containing gallium may be effectively used as a source of gallium for the diffusion of this impurity into Group IV semiconductors in accordance with the FIGURE 3*a–d* embodiment of this invention.

Figure 4B:
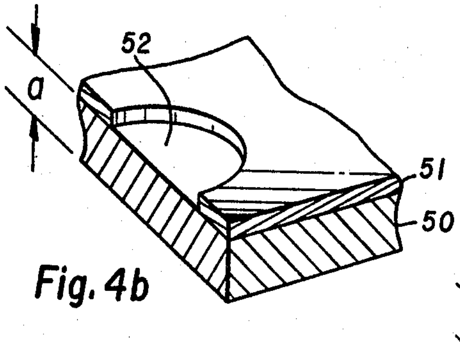
Figure 4A:
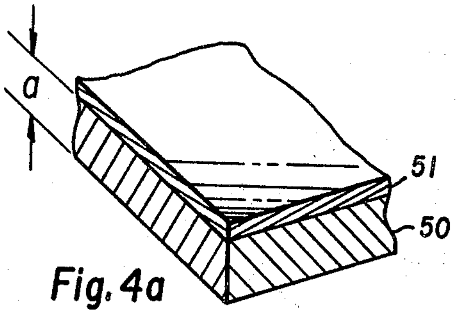
Figure 4D:
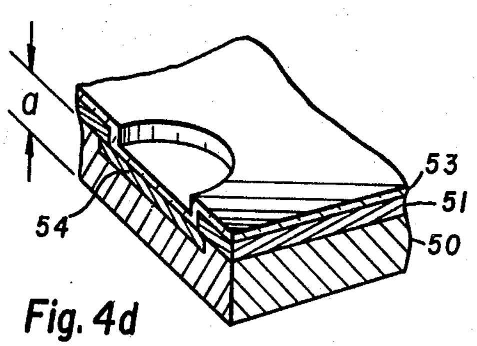
Figure 4C:
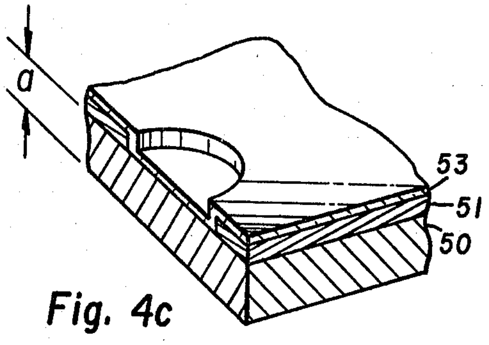

Another technique of making planar diffusions utilizing the invention is indicated by FIGURES 4*a–d*. A semiconductor wafer 50, FIGURE 4*a*, is coated with an oxide film 51 over its entire top surface in accordance with the invention. FIGURE 4*b* shows a small circular portion of the film 51 removed by appropriate techniques, leaving a centrally located hole 52. A second oxide film 53, FIGURE 4*c*, is reactively sputtered over the entire top surface of the wafer 50, resulting in an oxide coating of differential depth as shown in FIGURE 4*c*, said coating being only as thick as the second oxide film 53 on that portion of the surface of the wafer which was defined by hole 52 in the first film 51. This region is thick enough to prevent surface deterioration and yet thin enough to allow diffusion therethrough. The thicker region comprised of film 51 and film 53 is thick enough to prevent diffusion therethrough and thus protects the remaining surface of the semiconductor wafer from diffusion. When the structure shown in FIGURE 4*c* is exposed to a conventional impurity diffusion environment, the impurities

TABLE II

| Substrate Material | Applied Voltage in Volts | Measured Current in Milliamperes | Silicon Cathode Diameter in Centimeters | Impurity Cathode Area in Cm.² | Electrode Separation in Centimeters | Environmental Gas | Gas Pressure in Torr | Impurity Cathode | Deposition Rate in A./Hr. |
|---|---|---|---|---|---|---|---|---|---|
| GaAs | 1,800 | 60 | 7.9 | 1.83 | 3.2 | Oxygen | .040 | Zn | 1,450 |
| GaAs | 1,800 | 120 | 9.5 | 1.83 | 2.54 | do | .046 | Zn | 1,050 |
| GaAs | 1,800 | 120 | 9.5 | 1.83 | 2.54 | $O_2$-Ar | .046 | Zn | 1,050 |
| Ge | 1,800 | 60 | 7.9 | [2] 7.9 | 3.2 | Oxygen | .040 | As | 1,450 |
| Si | 1,800 | 60 | 7.9 | [2] 7.9 | 3.2 | do | .040 | As | 1,450 |
| Ge | 1,800 | 60 | 7.9 | 5.0 | 3.2 | do | .040 | Sb | 1,450 |
| Si | 1,800 | 60 | 7.9 | 5.0 | 3.2 | do | .040 | Sb | 1,450 |
| GaAs | 1,800 | 60 | 7.9 | 1.0 | 3.2 | do | .040 | Zn | 1,450 |
| GaAs | 1,800 | 120 | 9.5 | 1.0 | 2.54 | do | .046 | Zn | 1,050 |
| GaAs | 1,800 | 120 | 9.5 | 1.0 | 2.54 | $O_2$-Ar | .046 | $Zn^{65}$ | [1] 1,050 |
| InAs | 1,800 | 60 | 7.9 | 1.83 | 3.2 | Oxygen | .040 | Zn | 1,450 |
| InSb | 1,800 | 60 | 7.9 | 1.83 | 3.2 | do | .040 | Zn | 1,450 |

[1] The actual concentration of zinc in the oxide film was determined to be $10^{19}$ atoms/cm.³ by counting nuclear disintegrations.
[2] The cathode was arsenic-doped silicon (0.001 ohm-cm.).

Figure 2A:
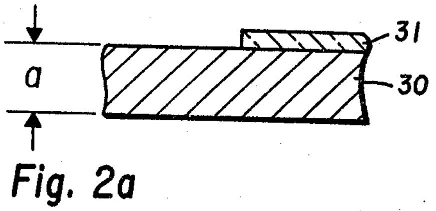
Figure 2B:
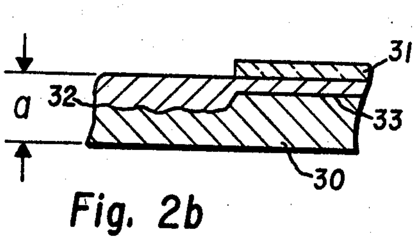

FIGURE 2*a* depicts a compound semiconductor 30 one surface of which has been partially coated with an undoped film 31 of silicon oxide in accordance with the invention, by masking a portion of the wafer (unit 16 in FIGURE 1) by any suitable means against bombardment by the silicon particles. The same semiconductor wafer 30 is shown in FIGURE 2*b* after being first partially coated with the undoped film 31, and subsequently the whole surface is exposed to an impurity diffusion atmosphere. As can be seen from the figure, the impurity penetrates through the surface of and within the body of the wafer to form therein the interface 32 which is deeper and somewhat ragged in the portion of the wafer not protected by the oxide coating 31, but smooth and nearer the surface of the wafer beneath the coating, owing to the protective effect of the film 31. Said film thus advantageously affords surface protection during diffusion to prevent the occurrence of an erratic diffusion interface attributable to loss of the volatile constituent from the compound semiconductor wafer.

diffuse through the thinner portion of the film to form a localized planar diffused area 54, FIGURE 4*d*, in the surface of the semiconductor wafer 50. It will be appreciated that for given diffusion rates the thickness of the oxide film necessary to prevent diffusion into and deterioration of the semiconductor wafer may vary from less than 10,000 A. to more than 20,000 A., whereas to permit diffusion but still prevent deterioration of the semiconductor the thickness of the film may vary from less than 500 A. to more than 10,000 A. It will further be understood that the masking afforded by the thicker regions of oxide film is achieved since the time required for impurities to diffuse through the thicker layer is greater than the time diffusion is conducted into the wafer through the hole 52. Thus by using differential depth oxide films, both masking against diffusion and selective formation of localized diffusions may be achieved in compound semiconductors without deterioration thereof.

Figure 5:
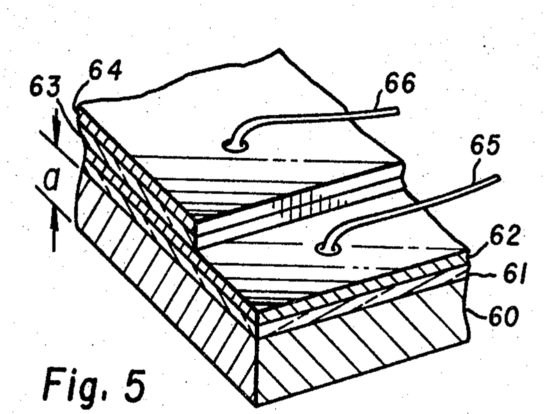

In FIGURE 5 a semiconductor substrate 60 is depicted having an undoped silicon oxide film 61 deposited thereover by reactive sputtering in accordance with the invention. A thin metallic film 62, such as aluminum, is then deposited thereover by any suitable means, such as evaporation or physical sputtering. A reactively sputtered oxide film 63 is thereafter deposited on a portion of the metallic film 62, and then another metallic film 64 is deposited thereover. The resultant sandwich structure represents a capacitive device with an oxide of silicon 63 as the dielectric medium. A contact 65 may be easily applied to the underlying aluminum film 62 and a contact 66 to the overlying film. Hence it will be appreciated that capacitive regions may be easily fabricated in integrated circuitry by the reactive sputtering of oxides of silicon. In such a case, the portion of the top surface of the wafer occupied by the capacitor would be much less than the total surface of the top of the wafer. Other circuit elements would be formed in or on the wafer in accordance with known technology.

Layers of oxide formed in accordance with the invention have properties very similar to fused silica. The examples following indicate the physical and/or chemical characteristics of oxide films formed by this method:

EXAMPLE I

Polished wafers of 5 ohm-cm. silicon were cleaned in three successive treatments with a 1:1 solution of $HNO_3$ and $H_2O_2$ at 70° C., rinsed with deionized water, and dried. An oxide layer 3700 A. thick was deposited on one surface of each wafer by reactive sputtering. Electrical contact was made to the uncoated side of the wafer by electroless nickel plating and sintering. Contacts on the oxide layer were 0.062 inch diameter evaporated gold dots. Capacitance was measured with a General Radio GR–1610AH capacitance bridge. Average capacitance was 170 pf., yielding a dielectric constant of 3.54. The dielectric constant of fused silica is 3.78.

EXAMPLE II

Silicon wafers were prepared as described in Example I and coated with a reactively sputtered oxide of silicon. The refractive index of films deposited under various sputtering conditions was determined by ellipsometric techniques and is shown in Table III. The refractive index of thermally grown silicon dioxide measured by this technique is 1.51. Advantageously, the values shown in Table III compare favorably with the values for thermally grown silicon dioxide while the disadvantages resulting from use of the thermal growth technique as previously described are avoided.

TABLE III

Index of Refraction vs. Deposition Parameters

| Refractive Index | Deposition Rate (A./Hr.) | Volts | Pressure (Torr) |
|---|---|---|---|
| 1.41 | 1,100 | 2,000 | .035 |
| 1.54 | 730 | 1,500 | .065 |
| 1.44 | 1,450 | 2,000 | .050 |
| 1.48 | 1,000 | 1,500 | .100 |

Electrode separation=3 cm.
Cathode diameter=7.9 cm.
Environmental gas was oxygen.

Figure 6A:
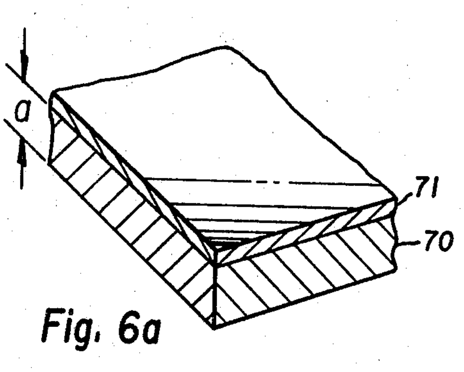
Figure 6B:
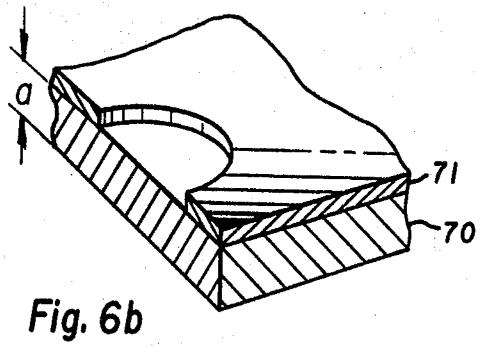
Figure 6C:
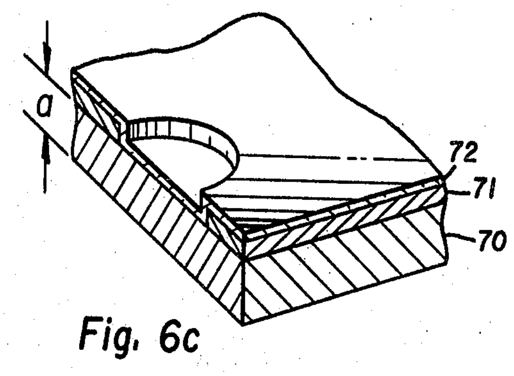
Figure 6D:
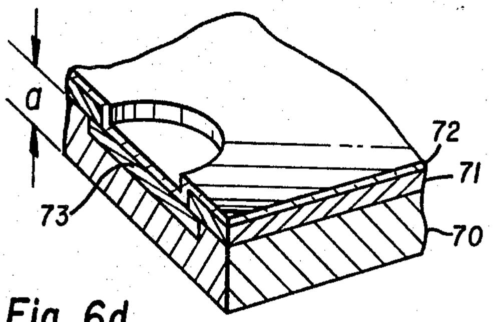

Another technique of producing localized planar diffused regions is indicated with reference to FIGURES 6*a–d*. Referring specifically to FIGURE 6*a*, an undoped oxide layer 71 is shown deposited by reactive sputtering on the surface of a semiconductor wafer 70. Using conventional techniques, a small circular portion of the oxide layer 71 is removed (FIGURE 6*b*). Thereafter an impurity-containing oxide film 72 is deposited by reactive sputtering over the entire top surface of the substrate and the undoped oxide film 71, resulting in a diffusible semiconductor substrate 70 having in contact with its surface a small circular layer of impurity-containing film 72 (see FIGURE 6*c*). The remainder of the surface is covered with an undoped oxide film 71. When the substrate is subjected to conventional diffusion temperatures, impurities diffuse from the impurity-containing film 72 into the surface of the semiconductor to form a localized diffused layer 73 as shown in FIGURE 6*d*. It will be appreciated that masking is effected by the undoped film 71 so long as the total diffusion period is less than the time required for the impurities to diffuse through the undoped layer 71 into the semiconductor wafer 70. The impurities in the film 72 can be of a conductivity-determining type which is opposite that in the original undiffused wafer 70, or of the same type.

Figure 7A:
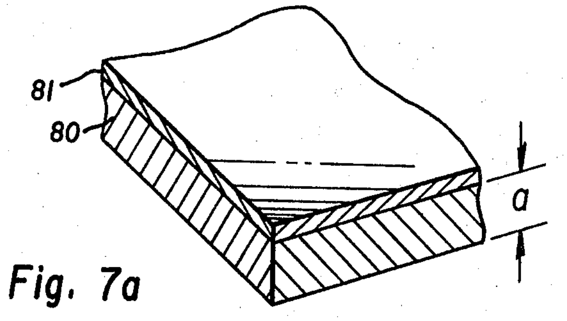
Figure 7B:
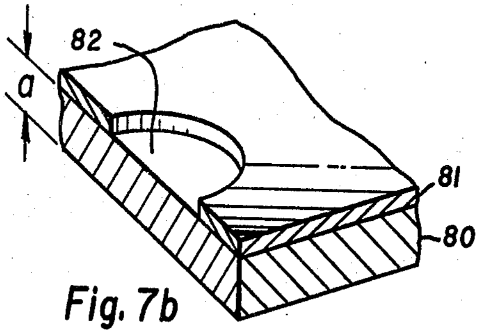
Figure 7C:
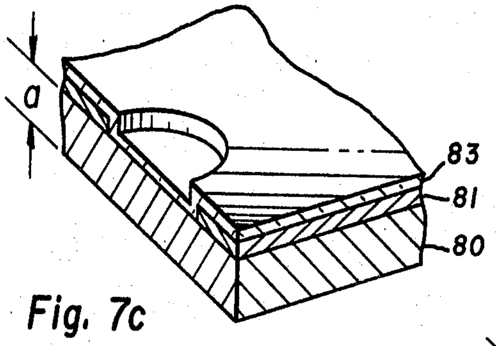
Figure 7D:
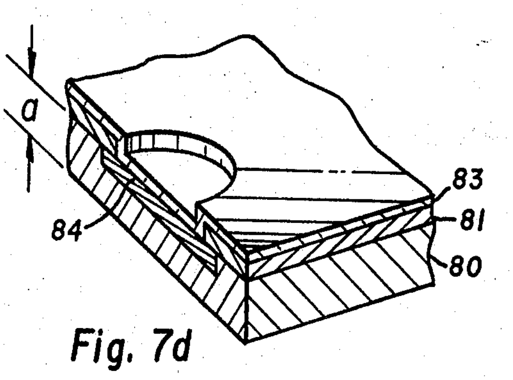
Figure 7E:
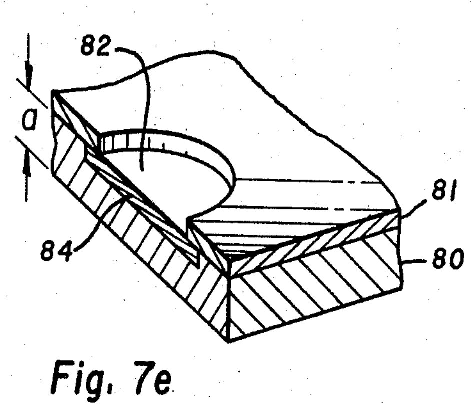
Figure 7F:
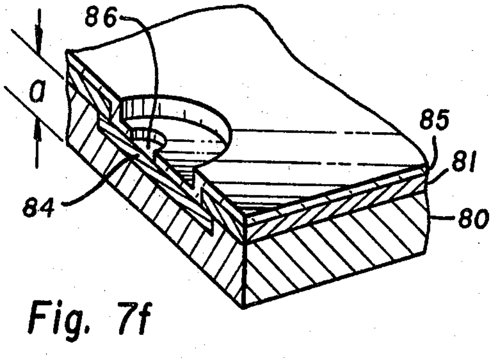
Figure 7G:
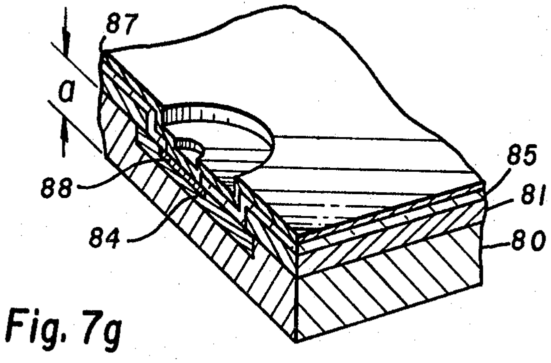
Figure 7H:
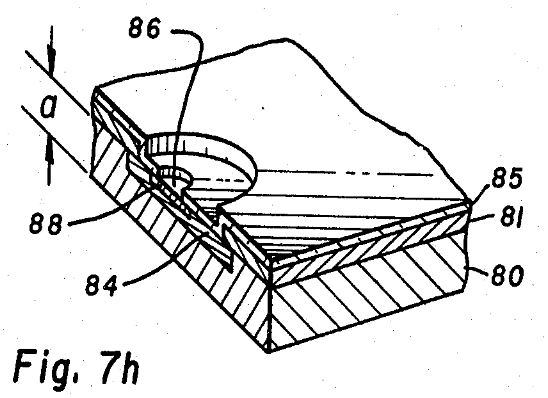
Figure 7I:
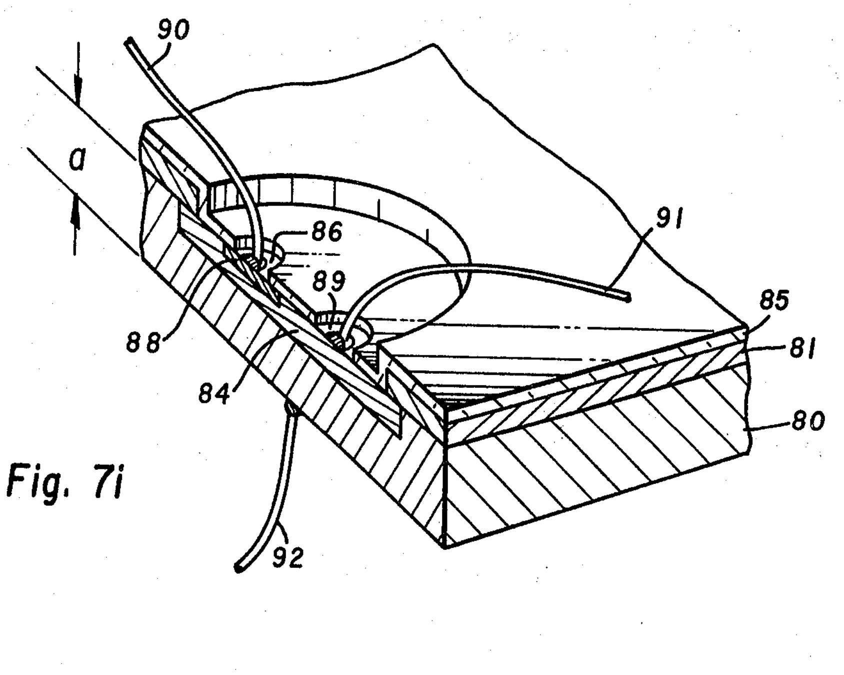

FIGURES 7*a–i* depict various stages of fabrication of a double-diffused planar transistor utilizing some of the advantages of reactively sputtered silicon oxide films. FIGURE 7*a* shows a semiconductive substrate or wafer 80 on which has been deposited a layer of reactively sputtered silicon oxide 81. A small circular window 82 is cut into layer 81 leaving a portion of the surface of wafer 80 exposed (see FIGURE 7*b*). Thereafter another silicon oxide layer 83 is deposited by reactive sputtering as shown in FIGURE 7*c*. Layer 83 contains conductivity-type determining impurities opposite that of wafer 80, so that when the substrate 80, as shown in FIGURE 7*c*, is heated said impurities diffuse from layer 83 into the surface of wafer 80 to form a localized planar diffused region 84 (see FIGURE 7*d*) which is of opposite conductivity-type of that of wafer 80. The impurity-containing layer 83 is then removed by any suitable means, leaving, as shown in FIGURE 7*e*, the semiconductive wafer 80 with the silicon oxide layer 81 still intact. However, the surface of wafer 80 now exposed through window 82 is of opposite conductivity-type of that of the bulk of wafer 80 since the diffused region 84 was formed through window 82. It will be appreciated that wherever the P-N junction intersects the surface of the wafer said junction is under the protection of silicon oxide layer 81 because of the lateral diffusion of impurities entering the wafer 80 through window 82. Another undoped silicon oxide layer 85 is then deposited by reactive sputtering over layer 81 and the portion of the surface of diffused region 84 previously exposed through window 82 as shown in FIGURE 7*f*. A smaller window 86 is cut into layer 85 to expose only part of the surface of the diffused region 84. Next, another layer of silicon oxide 87 containing impurities of the same conductivity-type as the bulk of wafer 80 (and opposite that of diffused region 84) is deposited by reactive sputtering over the entire surface as shown in FIGURE 7*g*. The doped layer of silicon oxide 87 is in contact with the surface of wafer 80 only within the area defined by the smaller window 86 which exposes only part of the diffused region 84, the remainder of the surface of wafer 80 being protected by undoped layers of silicon oxide 81 and 85. Therefore, when the substrate is again heated, impurities diffuse from layer 87 into the surface of wafer 80 only in the area defined by window 86. Thus impurities from layer 87 diffuse only into the previously diffused region 84 forming a double-diffused region 88. After this diffusion step, layer 87 is removed leaving wafer 80, layer 81 and layer 85 intact, and exposing only that portion of the surface of wafer 80 which is defined by window 86 as shown in FIGURE 7*h*. Another small window 89 is cut into layer 85 to expose another part of the surface of the first-diffused region 84 (see FIGURE 7*i*) to facilitate ohmic connection of lead 91 to diffused region 84 which serves as a diffused base in the transistor structure. Double-diffused layer 88, now being of the opposite conductivity-type of that of base region 84, serves as the emitter and an ohmic connection thereto is made with emitter lead 90 through window 86. Collector lead 92 is connected to the opposite surface of wafer 80 to complete the double-diffused transistor structure.

It will be appreciated that a transistor structure as described above utilizes many of the advantages of the invention. For example, both diffused regions are formed by the diffusion of an impurity from a doped film into the semiconductive wafer to obtain the relative flatness of diffusion fronts which is characteristic of this process. Furthermore, the P-N junctions are formed under the protection of an undoped silicon oxide film which protects the junction from surface effects; thus no further surface passivation is necessary for the completed device. Another advantage of particular importance in the fabrication of compound semiconductor devices is that all diffusions are made while the entire surface of the wafer is protected by at least one player of silicon oxide, thereby avoiding the severe surface deterioration and decomposition problems normally encountered where conventional diffusion processes are used.

Figures 8, 9:
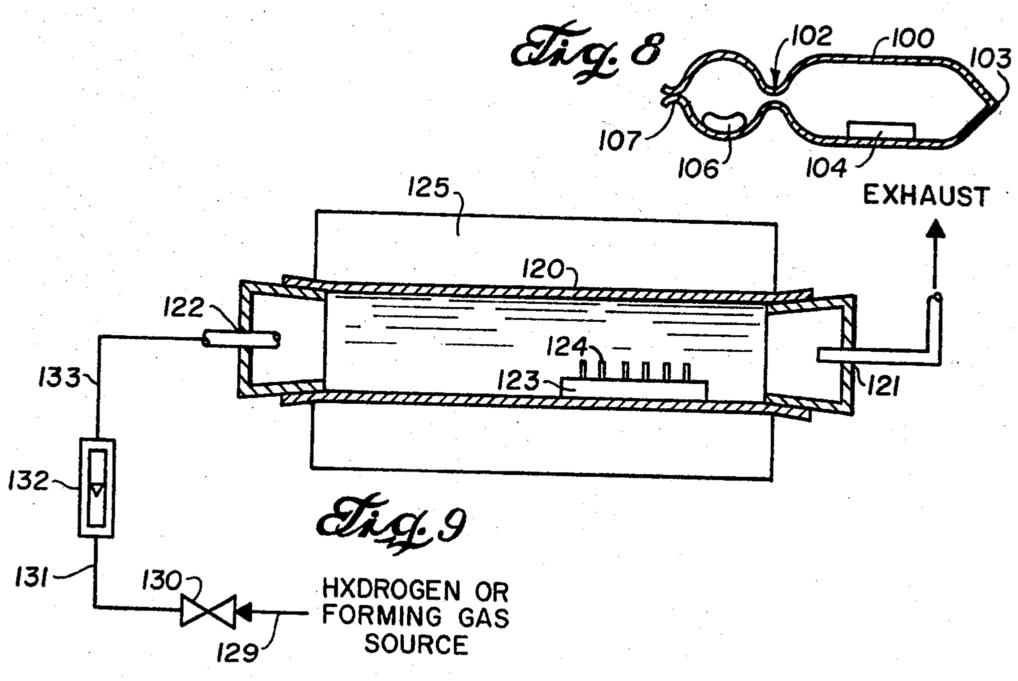
FIGURE 8 depicts apparatus for sealing tube diffusion of compound semiconductor material.
FIGURE 9 depicts suitable apparatus for open tube diffusion of impurities into a compound semiconductor out of an oxide of silicon coating thereover.

Referring now to FIGURE 8, there is illustrated the conventional sealed or closed tube diffusion apparatus which consists of a quartz ampoule or tube 100 having a restriction 102 therein. Seal 103 is made after insertion of the substrate 104 which is to be diffused and after insertion of the impurity carrier material 106. Ampoule 100 has a break-off sealing tip 107 which is coupled to an evacuation system to decrease the pressure within the tube 100 to $10^{-6}$ torr, then the ampoule 100 is sealed. Ampoule 100 is at this stage ready to be inserted in a furnace to provide diffusion of the impurity contained in carrier material 106 into wafer 104.

Referring to FIGURE 9, the open tube diffusion apparatus utilized in the invention consists of a quartz reaction tube 120 fitted with an exhaust cap 121 and inlet cap 122. A diffusion furnace 125 (schematically illustrated) surrounds substantially the entire tube 120 to provide a diffusion region therein. Within the tube 120, a quartz boat 123 is provided to hold wafers 124 during diffusion. To obtain a controlled flow of inert or forming gas ambient into the diffusion tube 120, a flow control system is provided. The source of inert or forming gas 129 such as hydrogen or forming gas is coupled with the reaction tube 120 by a valve 130, pipe 131, flow meter 132, and pipe 133 provides a flow path from meter 132 to introduce gas from source 129 in reactor tube 120.

The diffusion apparatus and process illustrated in FIGURE 8 were utilized for purposes of comparing characteristic qualities of lasers made utilizing the apparatus and process of FIGURE 9 in accordance with the invention against those made without the benefit of the limited-source impurity, silicon dioxide film technique.

In general in the examples presented in Table IV following hereinafter, the sputtered film thicknesses ranged from 6700 to 7500 Angstroms, and all diffusions out of the film were at 900° C. in a flowing hydrogen or forming gas environment. Further, in Table IV for purposes of illustration, gallium arsenide was the compound semiconductor utilized. It was N-type conductivity with a tin concentration of $10^{17}$ atoms/cc., having a resistivity of 0.015 to 0.02 ohm.-cm. The silicon cathode was 0.01 ohm-cm. arsenic doped. The transistors made from Examples 2 and 9 were fabricated after diffusion according to the method set forth in my copending application hereinbefore referenced.

Figure 10:
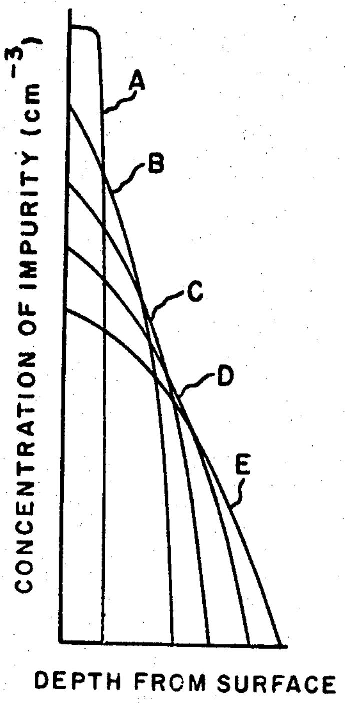
FIGURE 10 illustrates the impurity distribution of zinc concentration vs. depth for different time functions.

The distribution of zinc impurity as a function of time of diffusion out of the silicon dioxide film is illustrated in FIGURE 10. The abscissa represents depth from the surface of the semiconductor wafer and the ordinate represents the zinc concentration in relative proportions. For example, after approximately 15 minutes of diffusion, curve A would be illustrative of the impurity concentration distribution, whereas after a varying number of hours up to about 40, curves B, C. D and E, respectively, would be typical of the impurity concentration distribution in the semiconductor wafer.

Considering the curves in FIGURE 10 in conjunction with Table IV, it will be noted that sheet resistance, except for very short diffusions, remains essentially constant regardless of depth. Thus, it would be established that only a given quantity of impurity (zinc) is available for diffusion. The behavior could be described by a Gaussian distribution except for curve A which exhibits

TABLE IV

| Example | Open Tube Diffusion: Time [1] (Hrs.) | Open Tube Diffusion: Atmosphere (½ l./min.) | Crystal Data After Diffusion: Sheet Resistance (Ω/sq.) | Crystal Data After Diffusion: Bulk Resistivity (Ω-cm.) | Reverse Diode Breakdown, V. | Junction Depth (Mils) | N Power [2] of Junction Capacitance $C_j$, Equation |
|---|---|---|---|---|---|---|---|
| 1 [3] | 3 | Form. Gas | .095–.110 | 0.03 | 10 | .075–.10 | ---- |
| 2 [4] | 3 | Form. Gas | ---- | ---- | 12 | .095 | ---- |
| 3 | 1 | $H_2$ | 44.3–56.0 | 0.04 | 15 | 0.125 | ---- |
| 4 | 1 | $H_2$ | 58.6–68.0 | 0.03 | 12 | 0.095 | ---- |
| 5 | 1 | $H_2$ | 46.0–55.0 | <0.05 | 10 | 0.125 | ---- |
| 6 | 1 | $H_2$ | 58.6–68.0 | 0.02 | 12 | 0.095 | .40–.41 |
| 7 | 3 | $H_2$ | ---- | ---- | ---- | 0.088 | ---- |
| 8 | 3 | $H_2$ | ---- | ---- | ---- | 0.080 | ---- |
| 9 [5] | (7) | $H_2$ | 55.0–65.0 | .03 | 15 | .125 | ---- |
| 10 | 24 | $H_2$ | 54.6–67.9 | .06 | 15–20 | .182 | .40 |
| 11 [6] | 32 | $H_2$ | 56.1 | .036–.042 | 15 | .222 | .36–.37 |
| 12 | 32 | $H_2$ | 53.3–58.4 | .037–.044 | 15 | .220 | ---- |
| 13 | 1 | $H_2$ | 33.5–32.25 | .034–.037 | ---- | .125 | ---- |
| 14 | ½ | $H_2$ | 37.0–39.0 | .005–.006 | ---- | .120 | ---- |
| 15 | ¼ | $H_2$ | 42.5–49.1 | .014–.02 | ---- | .1 | ---- |
| 16 | 5 min. | $H_2$ | 90.0–97 | .02–.03 | ---- | ---- | ---- |

[1] Samples except as otherwise noted were maintained at 900° C. for period specified.

[2] Junction capacitance equation is $C_j=A[V-Vd]-n$ where A is a constant, V is the applied bias voltage, Vd is the barrier potential and n is a power between 0.5 and 0.33.

[3] For one sample slice of this crystal, processed concurrently with the example slice reported herein, the overall variation of junction depth was determined by measuring junction depths in four quadrants of the sample. In the first quadrant four readings were .098 mils; in the second quadrant four readings were .088 mils; in the third quadrant six readings ranged from .098 to .12 mils; and in the fourth quadrant two readings were .088 mils: the readings indicating insignificant variations within the accuracy of the measuring technique.

[4] A transistor made from this crystal had a beta of 2½.

[5] A transistor made from this crystal had a beta of 1½.

[6] Both mesa diodes and lasers were made from this crystal as later described.

[7] 2 at 900° C.; cooled to 400° C. over 2½ hr. period.

the concentration dependent diffusion coefficient of zinc. The effect of these combined factors is that short periods of diffusion (15 minutes to 3 hours) produce junction depths approximately the same. Longer diffusion approximates the Gaussian distribution. Diffusion times of 15 minutes and under produce degenerate P type layers (tunnel diodes have been made therefrom).

Figure 11:
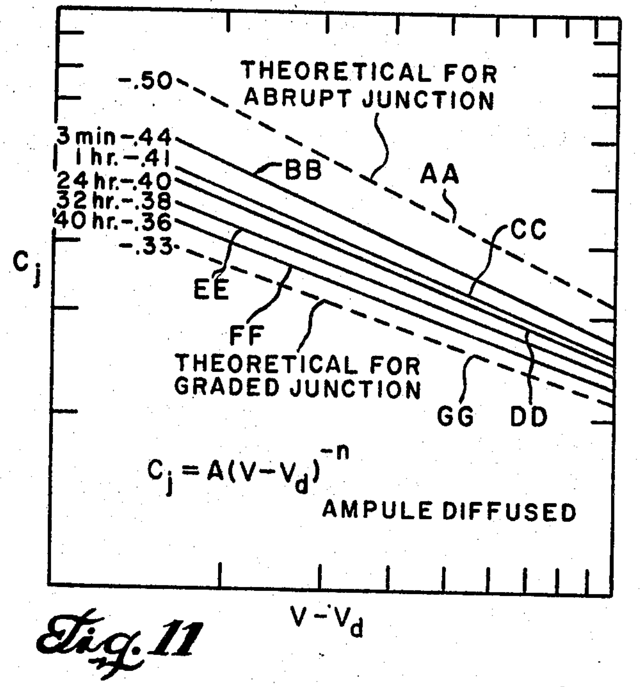
FIGURE 11 illustrates the junction capacitance vs. voltage values.

Further substantiating the distribution, with reference to FIGURE 11, the junction capacitance for the various crystals in Table IV was determined. The value of $n$ should be 0.5 for an abrupt junction and 0.33 for a graded junction. Curves BB–FF in FIGURE 11 illustrate the change in distribution of zinc impurities from abrupt to graded with increased diffusion time.

Laser devices were made from a slice of the crystal next to the slice in Example 11 by the sealed ampoule diffusion (see FIGURE 8 for typical apparatus). The ampoule was evacuated and sealed with elemental zinc and a wafer about 1 inch diameter and 20 mils thick. The diffusion was at 915° C. for 2½ hours. The junction depth was about 0.3 mil and was irregular. The diffused crystal slice of Example 11 having a 0.222 mil junction was made into laser devices. In each case the crystal slices were cut into 20 x 20 mil wafers and fabricated. The characteristics of current threshold and current density for the laser devices are compared in Table V hereinafter. These devices were made according to the usual laser fabrication process of cutting on the 110 plane and making ohmic contacts on opposed sides of the junction. Laser numbers 1 through 7 were made from the gallium arsenide diffusion substrates of the invention which contained impurities in the silicon dioxide coating, whereas lasers 8 through 16 were made by diffusing elemental zinc into a gallium arsenide wafer in a closed tube system (see FIGURE 8 for such a technique).

TABLE V

| Laser Number | Current Threshold (Amp.) | Current Density (Amp./cm.²) |
|---|---|---|
| 1 | 54 | 20,930 |
| 2 | 38 | 14,728 |
| 3 | 30 | 11,638 |
| 4 | 40 | 15,503 |
| 5 | 54 | 20,930 |
| 6 | 160 | 62,015 |
| 7 | 100 | 38,759 |
| 8 | 350 | 135,659 |
| 9 | 220 | 85,271 |
| 10 | 140 | 54,263 |
| 11 | 370 | 143,410 |
| 12 | 290 | 112,403 |
| 13 | 250 | 96,899 |
| 14 | 200 | 77,519 |
| 15 | 280 | 108,529 |
| 16 | 230 | 89,147 |

NOTE.—Current values were obtained at 78° K.

Figure 12A:
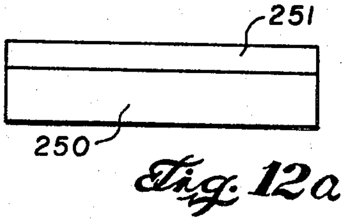
FIGURE 12 depicts the various stages of fabrication for a mesa diode according to the invention.
Figure 12B:
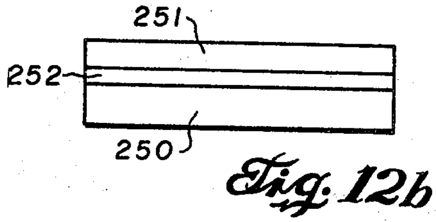
Figure 12C:
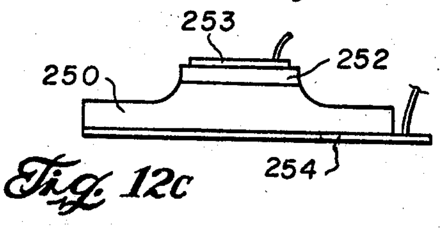

Referring to FIGURE 12, the process of making a mesa diode according to the invention will be described. A compound semiconductor wafer 250 having a silicon dioxide layer 251 thereover is provided. The layer 251 contains a uniformly distributed controlled concentration of impurities therein which, after diffusion, will impart opposite-type conductivity to a region of wafer 250. The diffusion region 252 is achieved by subjecting wafer 250 having layer 251 thereover to a diffusion environment such as provided by the apparatus depicted in FIGURE 9 at a temperature appropriate for diffusion.

After diffusion, the mesa diode is fabricated by the usual mesa forming techniques. A suitable ohmic contact 253 is made to the diffused region 252, and a suitable ohmic contact 254 is made to the wafer 250 to complete the device.

The mesa diodes made from the crystal of Example 11 in Table IV, according to the above process, had 20 x 20 mil mesas with evaporated gold-zinc contacts on the P-layer (mesa surface) and gold-antimony on the $n$-region (wafer base).

It will be appreciated that many variations and changes as to the detailed techniques of processing devices in accordance with the broad teachings of the invention will be readily apparent to those skilled in the art.

It is to be understood that the above-described methods and products made thereby are merely illustrative of the application of the principles of the invention. Numerous other arrangements may be devised by those skilled in the art without departing from the spirit and scope of the invention as defined by the appended claims.

What is claimed is:

1. In the method of diffusing conductivity-affecting impurities into a compound semiconductor body selected from the group consisting of gallium arsenide, indium antimonide, and indium arsenide; the process of depositing an oxide of silicon layer containing a controlled concentration of conductivity-affecting impurities over a portion of a surface of said compound semiconductor body, said layer being not less than about 6700 angstrom units thick, and thereafter diffusing the impurities out of said layer and into said body.

2. The method of protecting a compound semiconductor selected from the group consisting of gallium arsenide, indium antimonide, and indium arsenide from undergoing surface deterioration during diffusion of conductivity-affecting impurities thereinto comprising the steps of concurrently depositing reactively sputtered silicon oxide and conductivity-affecting impurities on a surface of said compound semiconductor and thereafter diffusing the conductivity-affecting impurities from said silicon oxide layer into said compound semiconductor.

3. The method of forming a P-N junction in a compound semiconductor body of one-type conductivity selected from the group consisting of gallium arsenide, indium antimonide, and indium arsenide, comprising the steps of:

(a) depositing an oxide of silicon layer containing a controlled amount of conductivity-affecting impurities on a surface of said compound semiconductor body, said oxide of silicon layer being of sufficient thickness to prevent deterioration of said surface at diffusion temperatures, said conductivity-affecting impurities being of opposite conductivity-type to said one-type conductivity, and (b) diffusing said conductivity-affecting impurities from said oxide of silicon layer into said surface of said compound semiconductor body.

4. The method of claim 3, wherein said compound semiconductor is gallium arsenide.

5. The method of forming a planar P-N junction in a compound semiconductor body of a first conductivity-type selected from the group consisting of gallium arsenide, indium antimonide, and indium arsenide, comprising the steps of:

(a) depositing a first silicon oxide layer on selected portions of a surface of said body, said silicon oxide layer containing conductivity-affecting impurities of a second conductivity-type;

(b) depositing a second silicon oxide coating on said first oxide coating and on the exposed surface of said compound semiconductor, said second coating being sufficiently thick to prevent the deterioration of said compound semiconductor surface during diffusion and being substantially free from conductivity-affecting impurities, and (c) diffusing said second conductivity-type impurities from said first layer into said selected portions of said compound semiconductor body.

6. The method of coating a semiconductor substrate with an impurity-containing oxide of silicon comprising the steps of positioning the substrate near a silicon cathode in a chamber, maintaining a gaseous environment comprising oxygen and a conductivity-affecting impurity at a relatively low pressure within the chamber, and applying a voltage to the cathode with the cathode being negative with respect to the semiconductor substrate.

7. The method of coating a semi-insulating substrate with an impurity-containing oxide of silicon comprising positioning the substrate near a cathode comprising silicon and a conductivity-affecting impurity in a chamber, maintaining an oxygen-containing environment at a low pressure within the chamber, and applying a voltage to the cathode with the cathode being negative with respect to the substrate.

8. The method of claim 7, wherein said semi-insulating substrate is gallium arsenide.

9. In the fabrication of semiconductor devices, the process comprising the steps of:

(a) positioning a semiconductor substrate in spaced relation to a cathode comprising silicon and a conductivity-affecting impurity in chamber,
(b) maintaining an oxygen-containing environment at a relatively low pressure within the chamber,
(c) applying a voltage between said cathode and said substrate thereby causing a coating of an impurity-containing film to be deposited on the substrate,
(d) removing substantially all of the impurity-containing film from the substrate except over predetermined portions for diffusion regions, and
(e) thereafter overcoating the partially coated semiconductor substrate with a film of silicon oxide sufficiently thick to prevent deterioration and decomposition of the semiconductor surface when exposed to diffusion temperatures.

10. In the fabrication of semiconductor devices, the process comprising the steps of coating at least a portion of a semiconductor substrate with a reactively sputtered conductivity-affecting, impurity-containing oxide film, removing said film from the substrate except over predetermined portions for diffusion regions, overcoating the exposed semiconductor surface and the remaining impurity-containing film with a reactively sputtered oxide film, and thereafter exposing said semiconductor substrate to a temperature sufficient to cause the impurities to diffuse from the impurity-containing film into the semiconductor substrate.

11. In the fabrication of semiconductor devices, the process comprising the steps of coating at least a portion of the surface of a semiconductor substrate with a layer of silicon oxide, removing said oxide from the portion of the semiconductor surface where a diffused region is desired, and thereafter overcoating the partially coated semiconductor surface with an impurity-containing oxide of silicon, thereby forming a diffusible substrate having a region coated with a single layer of impurity-containing oxide film defined by a double layer of oxide, the first layer being sufficiently thick to prevent the diffusion of conductivity-affecting impurities from the second layer into the semiconductor substrate.

12. In the fabrication of semiconductor devices, the process comprising the steps of coating at least a portion of the surface of a semiconductor substrate with a layer of reactively sputtered oxide, removing said oxide from a predetermined portion for diffusion regions of the semiconductor surface, and thereafter reactively sputtering an impurity-containing oxide coating over the partially coated semiconductor surface.

13. In the fabrication of semiconductor devices, the process comprising the steps of coating at least a portion of the surface of a semiconductor substrate with an oxide of silicon, removing the oxide coating from a predetermined portion for diffusion regions of the semiconductor surface, and thereafter overcoating the partially coated surface of the semiconductor with a reactively sputtered oxide of silicon, thereby forming a diffusable semiconductor substrate having on its surface a coating of silicon oxide of differential depth permitting the diffusion of conductivity-affecting impurities through the thinner region but preventing the diffusion of conductivity-affecting impurities through the thicker region of the oxide coating.

14. In the fabrication of a double-diffused transistor, the process comprising the steps of:

(a) coating at least a portion of the surface of a semiconductor substrate of a first conductivity-type with a first coating of reactivity sputtered silicon oxide, said oxide containing a conductivity-affecting impurity for forming a diffusion region in said substrate of a second conductivity-type opposite to said first conductivity-type,
(b) removing said oxide from the surface of the substrate except over predetermined portions for diffusion regions of the second conductivity-type,
(c) overcoating said surface and said remaining impurity-containing oxide with a second coating of an undoped reactivity sputtered oxide of silicon,
(d) heating said coated substrate to a temperature sufficient to cause the conductivity-affecting impurities to diffuse from said impurity-containing oxide into the semiconductor, to form a diffused region of said second conductivity-type,
(e) removing a portion of said first and second oxide coatings to form an opening therein to expose part of the surface of said diffused region, and
(f) thereafter introducing conductivity-affecting impurities through said opening in said coatings into said diffused region to form a double-diffused region within said first diffused region with said double-diffused region being of said first conductivity-type.

15. In the fabrication of a double-diffused transistor, the process comprising the steps of:

(a) coating at least a portion of the surface of a semiconductor substrate of a first conductivity-type with a first layer of silicon oxide,
(b) removing said first layer from a predetermined portion of the surface of said semiconductor for a first diffusion region,
(c) overcoating said first layer and the exposed portion of the semiconductor with a second layer of silicon oxide, said second layer being reactively sputtered silicon oxide and containing conductivity-affecting impurities of a second conductivity-type,
(d) exposing said substrate to a temperature sufficient to cause said impurities to diffuse from said second layer into the semiconductor in the region where said first layer has been removed to form a diffused region having a second conductivity-type opposite to said first conductivity-type,
(e) removing said second layer from the surface of the diffused region leaving an assembly with said first layer in contact with the semiconductor surface,
(f) thereafter overcoating said assembly and the exposed diffused region of said substrate with a third layer of undoped reactively sputtered silicon oxide,
(g) removing a portion of said third layer to expose a portion of the surface of the semiconductor where said first diffused region has been formed,
(h) coating the assembly with a fourth reactively sputtered silicon oxide layer, so that at least the portion of the semiconductor surface exposed through the removal of said portion of said third layer is overcoated, said fourth layer containing first conductivity-type impurities.
(i) and thereafter diffusing said first conductivity-type impurities from said fourth layer into part of the first diffused region, thereby forming a double-diffused region within said first diffused region, said double-diffused region being of said first conductivity-type.

16. In the fabrication of a double-diffused transistor, the process comprising the steps of:

(a) coating at least a portion of the surface of a semiconductor substrate of a first conductivity-type with a first coating of reactively sputtered oxide, said oxide containing a conductivity-affecting impurity for forming a diffusion region in said substrate of a second conductivity-type opposite to said first conductivity-type, (b) removing said oxide from the surface of the substrate except over predetermined portions for diffusion regions of the second conductivity-type, (c) overcoating said surface and said remaining impurity-containing oxide with a second coating of an undoped reactively sputtered oxide, (d) heating said coated substrate to a temperature sufficient to cause the conductivity-affecting impurities to diffuse from said impurity-containing oxide into the semiconductor, to form a diffused region of said second conductivity-type, (e) removing a portion of said first and second oxide coating to form an opening therein to expose part of the surface of said diffused region, and (f) thereafter introducing conductivity-affecting impurities through said opening in said coatings into said diffused region to form a double-diffused region within said first diffused region with said double-diffused region being of said first conductivity-type.

17. The method of coating a semiconductor substrate with an impurity-containing oxide of silicon comprising positioning the semiconductor substrate in spaced relation to a cathode comprising silicon and a conductivity-affecting impurity in a chamber, maintaining an oxygen-containing environment at a relatively low pressure within the chamber, and applying a voltage between said cathode and said substrate, thereby causing atoms of silicon and impurity to be deposited on the semiconductor substrate in the form of an impurity-containing oxide of silicon.

18. The method of claim 17, wherein said semiconductor substrate is a compound semiconductor.

19. The method of claim 17, wherein said semiconductor substrate is gallium arsenide.

20. The method of claim 17, wherein the cathode comprises an alloy of silicon and said conductivity-affecting impurity.

21. The method of claim 17, wherein the cathode comprises silicon doped with said impurity.

22. The method of claim 17, wherein said cathode comprises a silicon member and a conductivity-affecting impurity source super-imposed on the silicon member.

23. The method of claim 17, wherein said oxygen-containing environment is in gaseous form and the environmental pressure is from about 0.01 torr to about 0.07 torr.

24. The method of claim 17, wherein said conductivity-affecting impurity is gallium.

25. The method of claim 24, wherein said semiconductor substrate is silicon.

26. The method of claim 17, wherein said conductivity-affecting impurity is selected from the group consisting of boron, aluminum, gallium, indium, phosphorous, mercury, arsenic, antimony, tin, germanium, magnesium, cadmium, zinc, copper, selenium, tellurium, sulfur, and manganese.

References Cited

UNITED STATES PATENTS

| | | | |
|---|---|---|---|
| 2,802,760 | 8/1957 | Derick | 148—187 |
| 2,886,502 | 5/1959 | Holland | 204—192 |
| 3,055,776 | 9/1962 | Stevenson | 148—187 |
| 3,093,507 | 1/1963 | Lander | 204—192 |
| 3,147,152 | 9/1964 | Mendel | 148—187 |
| 3,184,823 | 5/1965 | Little | 148—187 |
| 3,200,019 | 8/1965 | Scott | 148—187 |
| 3,235,476 | 2/1966 | Boyd | 204—192 |

FOREIGN PATENTS 878,585 6/1953 Germany.

HYLAND BIZOT, *Primary Examiner.*

U.S. Cl. X.R.

117—201, 212; 148—186, 190; 204—192